(12) United States Patent
Patankar et al.

(10) Patent No.: US 11,386,154 B2
(45) Date of Patent: Jul. 12, 2022

(54) METHOD FOR GENERATING A GRAPH MODEL FOR MONITORING MACHINERY HEALTH

(71) Applicant: KPIT Technologies Limited, Pune (IN)

(72) Inventors: Ravindra Patankar, Pune (IN); Mangesh Balkrishna Khare, Pune (IN); Venkatesh Kareti, Pune (IN); Priti Ranadive, Pune (IN)

(73) Assignee: KPIT TECHNOLOGIES LIMITED, Pune (IN)

( * ) Notice: Subject to any disclaimer, the term of this patent is extended or adjusted under 35 U.S.C. 154(b) by 410 days.

(21) Appl. No.: 16/092,710

(22) PCT Filed: Jan. 28, 2017

(86) PCT No.: PCT/IB2017/050466
§ 371 (c)(1),
(2) Date: Oct. 10, 2018

(87) PCT Pub. No.: WO2017/178902
PCT Pub. Date: Oct. 19, 2017

(65) Prior Publication Data
US 2019/0171669 A1 Jun. 6, 2019

(30) Foreign Application Priority Data
Apr. 11, 2016 (IN) .............................. 201621012575

(51) Int. Cl.
*G06F 16/901* (2019.01)
*G01M 17/00* (2006.01)
*G06F 11/07* (2006.01)

(52) U.S. Cl.
CPC ......... *G06F 16/9024* (2019.01); *G01M 17/00* (2013.01); *G06F 11/079* (2013.01)

(58) Field of Classification Search
CPC ... G06F 16/9024; G06F 11/079; G01M 17/00
See application file for complete search history.

(56) References Cited

U.S. PATENT DOCUMENTS 7,386,752 B1 6/2008 Rakic et al.
2004/0049365 A1 3/2004 Keller
(Continued)

OTHER PUBLICATIONS

International Search Report re Application No. PCT/IB2017/050466; 4 pages.

*Primary Examiner* — Tarun Sinha
*Assistant Examiner* — Yossef Korang-Beheshti
(74) *Attorney, Agent, or Firm* — Foley & Lardner LLP

(57) ABSTRACT

Systems and methods are described to create a comprehensive model from multiple input data sources in distributed manner for performing diagnostics and/or prognostics of a complex system/platform having its modules/parts implemented independent of each other. In an embodiment, the proposed system for creating a comprehensive connected model of a complex platform includes a input data receive module configured to receive data/content/information from one or more input data sources associated with different modules of the complex platform in a distributed manner, a dependency determination module configured to analyze a plurality of entities/variables retrieved from the data and determine dependency relationships between the plurality of entities by creating a edge list, and a connected model creation module configured to create a comprehensive connected model (connected graph) from the edge list.

14 Claims, 12 Drawing Sheets

(56) References Cited

U.S. PATENT DOCUMENTS

| | | | |
|---|---|---|---|
| 2006/0064291 A1* | 3/2006 | Pattipatti | G05B 23/0251 703/14 |
| 2008/0312783 A1* | 12/2008 | Mansouri | G07C 5/0816 701/31.4 |
| 2010/0010952 A1* | 1/2010 | Kuhn | G06Q 10/04 706/47 |
| 2011/0145647 A1 | 6/2011 | Hidaka | |
| 2011/0153540 A1 | 6/2011 | Beg | |
| 2012/0101793 A1* | 4/2012 | Cheriere | G06F 11/079 703/8 |

* cited by examiner

500

| Parent 502 | Child 504 |
|---|---|
| VA1 | VA3 |
| VA1 | VA2 |
| VA2 | VA1 |
| VA2 | VA3 |
| VA3 | 0 |
| VA3 | VA1 |
| VA3 | VA5 |
| VA5 | VA4 |
| VA5 | VA6 |
| VA5 | VA7 |
| VA6 | VA9 |
| VA6 | VA8 |
| VA7 | VA53 |
| VA7 | 8 |

FIG. 5

METHOD FOR GENERATING A GRAPH MODEL FOR MONITORING MACHINERY HEALTH

TECHNICAL FIELD

The present disclosure relates to system engineering. More particularly, the present disclosure relates to systems and methods for creating a comprehensive graph model that can be stored in a graph database for diagnostics and prognostics of an integrated system.

BACKGROUND

Background description includes information that may be useful in understanding the present invention. It is not an admission that any of the information provided herein is prior art or relevant to the presently claimed invention, or that any publication specifically or implicitly referenced is prior art.

Developing any software or hardware based system requires integration of several modules or parts, which may have been designed by different vendors in isolation. Manufacturing companies or system providers engineer any complex architecture with the help of various engineering teams, which may develop individual modules or engineering artifacts in silos. As different modules or engineering artifacts are designed and implemented independently, their specifications or documentation may not connect to each other seamlessly and may not follow any specific standard interface or input/output convention.

In order to identify problems or perform diagnostics or prognostics in such systems, a complete connected model or dependency map needs to be prepared so as to quickly determine the points of failure malfunction/damage. It has been observed that a more detailed model is more useful to pinpoint the points of failure of the malfunction. Moreover, such a model that represents detail beyond that is necessary for diagnostics alone could be used by stakeholders other than diagnostics engineers who may be interested in such additional connected detail. Normally, in order to create such a model, one has to use available engineering documentation as source data and try to "connect" different input/output variables/parameters with each other. Several system engineering issues are uncovered as the documentation does not necessarily connect and such issues need to be resolved, which brings a lot of system engineering insights for engineering process improvements. There is therefore a need to create a more comprehensive connected model from different input sources received from different vendors for various applications/stakeholders such as diagnostics, system engineering, support, analytics, prognostics, etc.

The need for such a model can be better understood with help of an example. For instance, a model-based diagnostics (MBD) helps in identifying and diagnosing evidences of vehicle malfunction, whereas Vehicle Diagnostic information such as diagnostic trouble codes (DTCs) available on vehicle CAN Bus are monitored and treated as evidences of vehicle malfunction, and therefore it would be desirable to know which points of failure of such malfunction in which parts or software variables can possibly result in each DTC evidence, and it would also be useful to have a model that connects the all knowledge related to this system for analytics, diagnostics, system engineering, support, prognostics, among other like functions. Existing connected models however need a lot of effort to be generated, need manual interventions during updating, and also are very slow while running queries on one or more entities/variables. Existing connected models are also not scalable and flexible.

FIG. 1 illustrates an existing static model created using predefined schemas according to known art. As shown in FIG. 1, existing systems/architectures 100 for generating model for diagnostics and prognostics perform fixed schema based data mapping 102 by collecting input data sources such as part list 108, DTC and PID list 110, warranty analysis results 112, service manual analysis results 114 etc. Existing system 100 then performs data mapping based on predefined fixed schema, where diagnostics model in this field follows structured database (DB) technology. Information extracted from existing system 100 can also receive appropriately parsed embedded code 116, function dependencies 106, and fault trees/DFMEA (Design Failure Mode and Effect Analysis) 104 from one or more input sources. The system 100 typically needs all data sources a priori parsed in appropriate format and requires manual mapping of the parsed data in appropriate tables 102 that follow a fixed schema.

Existing solutions therefore need all parsed data to be manually mapped (placed) in a structured DB at an "appropriate location". The amount of manual effort required to determine "appropriate locations" limits automation and how much data this approach can successfully place in "appropriate table locations" within the schema. Structured (relational) databases are very poor at traversing relationships via a query. Therefore, path queries are very time consuming and expensive to run on a structured database and often query results involving paths that have several relationships (join operations) can crash. Moreover, if multiple queries are received or operations performed by the DB at the same time, it slows the existing system significantly and can cause system crashes. This is therefore not a scalable approach.

Therefore, there exists a need for systems and methods for creating a comprehensive connected model for performing diagnostics and prognostics of a system. System and methods are required to create a comprehensive connected model from various sources of inputs, for example different engineering documents, source code(s), among other objects/entities/content repositories. System and methods are required to create a model for diagnostics and prognostics of a hardware system, such as of machinery platform, as well as for related software systems.

Systems and methods are required to create a model that can help uncover data gaps between various engineering documents, and can help uncover data mismatch between engineering artifacts. Comprehensive models are required to know which parts or software variables can possibly be the point of failure. Systems and methods are required to create a connected model that can be used for diagnostic reasoning.

All publications herein are incorporated by reference to the same extent as if each individual publication or patent application were specifically and individually indicated to be incorporated by reference.

Where a definition or use of a term in an incorporated reference is inconsistent or contrary to the definition of that term provided herein, the definition of that term provided herein applies and the definition of that term in the reference does not apply.

Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

It is an object of the present invention to provide systems and methods for creating a comprehensive connected model for performing diagnostics and prognostics of a system.

Another object of the present invention is to provide systems and methods to create a comprehensive connected model from various sources of inputs, for example different engineering documents, source code, etc.

Another object of the present invention is to provide systems and methods to create a model for diagnostics and prognostics of hardware system (for example machinery platform) as well as for software systems.

An object of the present invention is to provide systems and methods to create a model that can uncover data gaps between various engineering documents and can uncover data mismatch between engineering artifacts.

Another object of the present invention is to create a comprehensive model that can be used to know possible parts or software variables that can be the points of failure of malfunction/failure.

Yet another object of the present invention is to provide systems and methods to create a connected model that can be used for diagnostic troubleshooting.

SUMMARY

Systems and methods are described to create a comprehensive dynamic model from multiple input data sources in a distributed manner for performing diagnostics and/or prognostics of a complex system that has its modules/parts implemented independent of each other.

In an embodiment, the proposed system for creating a comprehensive connected model of a complex platform can include a non-transitory storage device having embodied therein one or more routines operable to facilitate generation of a connected graph (also interchangeably referred to as connected model); and one or more processors coupled to the non-transitory storage device and operable to execute the one or more routines, wherein the one or more routines can include an input data receive module, which when executed by the one or more processors, receives data (also referred to as content/information) pertaining to the complex platform from a plurality of input sources, wherein the received data can include, but is not limited to, system engineering documentation, software code, maintenance manual, among other content from one or more distributed or centralized input sources.

System of the present disclosure can further include a dependency determination module, which w % ben executed by the one or more processors, analyzes the received data (having, for instance, a plurality of entities/variables received from the plurality of input sources), and determines dependency relations (singular relationships) of the plurality of entities/variables by creating at least one edge list (also referred to as parent-child list). Analysis of received data to identify entities/variables can be used for generating and building a graph database that helps classify and store each entity/variable as either a node (having at least one node property) or an edge (having at least one edge property). Graph database (also referred to as graph db) therefore stores data in a manner such that the data is either a node/node property, or an edge (including edge property) connecting two nodes based on relationship therebetween. Graph relationships therefore have a strong advantage in terms of the fact that they are modelled directly through individual data and not indirectly via a mandatory schema (like in the case of prior art that relies on relational database). Entities/variables that are identified through analysis of received input source/software code data that disclose a relationship having a context can be classified as edges that connect two nodes (say a start node and an end node). Each identified edge can have an associated edge property. Similarly, each node can also be associated with a node property.

System of the present disclosure can further include a connected graph model creation module, which when executed by the one or more processors, creates a comprehensive connected model (also referred to as "connected graph model" or "connected graph") from the at least one edge list. In an exemplary implementation, the connected model can be represented in form of a connected graph. In an aspect, the connected graph can be constructed/amended/modified automatically sooner the graph database is generated and any change in graph database can enable respective changes to be reflected in the connected graph.

In an aspect, once the connected model/graph is constructed/generated, in order to perform diagnostic or prognostics, a network query for a node/entity of interest can be received, and the query can be executed to return all node entities connected to it directly and indirectly and the edges that connect them, thus providing the node's children, children's children, and so on. Additional query logic can be configured to fetch only the nodes and edges in this network with certain properties such as nodes that represent hardware parts or points of failure, or tests or repairs.

Graph databases allow for node queries, edge queries, node and edge property queries and network queries involving several nodes and possible paths connecting them to other nodes. Graph databases also allow for shortest and longest path queries which execute a few orders of magnitude faster than a relational database with much lower memory requirements.

In an aspect, the connected model created can be used for diagnostic and/or prognostics of any complex system designed using modules of different vendors.

A comprehensive model can be created from diverse input data sources, such as specification documents, simulink models, source code, systems engineering documentations, maintenance manual, etc. associated with each individual part/module of the system. The comprehensive connected model as created by the proposed system describes connectivity of different entities related to diagnostics and prognostics such as health indicators, parts, faults, repair actions etc., and provides holistic connectivity and dependency map. This holistic connectivity/dependency map described by the connected graph model is valuable in systems engineering, and can make an excellent source of up to date diagnostic information for different engineering silos that develop their documentation/artifacts independently.

In an exemplary implementation, dependency determination module (YUCCA) can incorporate a comprehensive way to perform software analysis for parsing one type of input (embedded codes) to extract relevant relations to build the model/graph. In an exemplary implementation, Matlab-Simulink or alike higher level software languages can also be used to extract dependency information with ease if the controller code is available in a higher level language such as Matlab-Simulink. The parsed dependency information here describes a network of software variables capable of extracting how each diagnostic trouble code software variable is affected by controller input and output software variables.

In an aspect, system of the present disclosure can be used for model-based diagnostics (MBD) to identify and diagnose vehicle troubles. Vehicle Diagnostic information (DTCs) available on vehicle CAN Bus can be monitored to identify fault symptoms.

In an exemplary implementation, connected model can be used for enabling various services such as diagnostics, analytics, prognostics, support for analysis etc. for various stake holders such as Systems Engineers, Calibration Engineers, and Service Technicians.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 5 illustrates an exemplary variable dependency table (edge list) created based on software analysis in accordance with an embodiment of the present disclosure.

DETAILED DESCRIPTION

Figure 1:
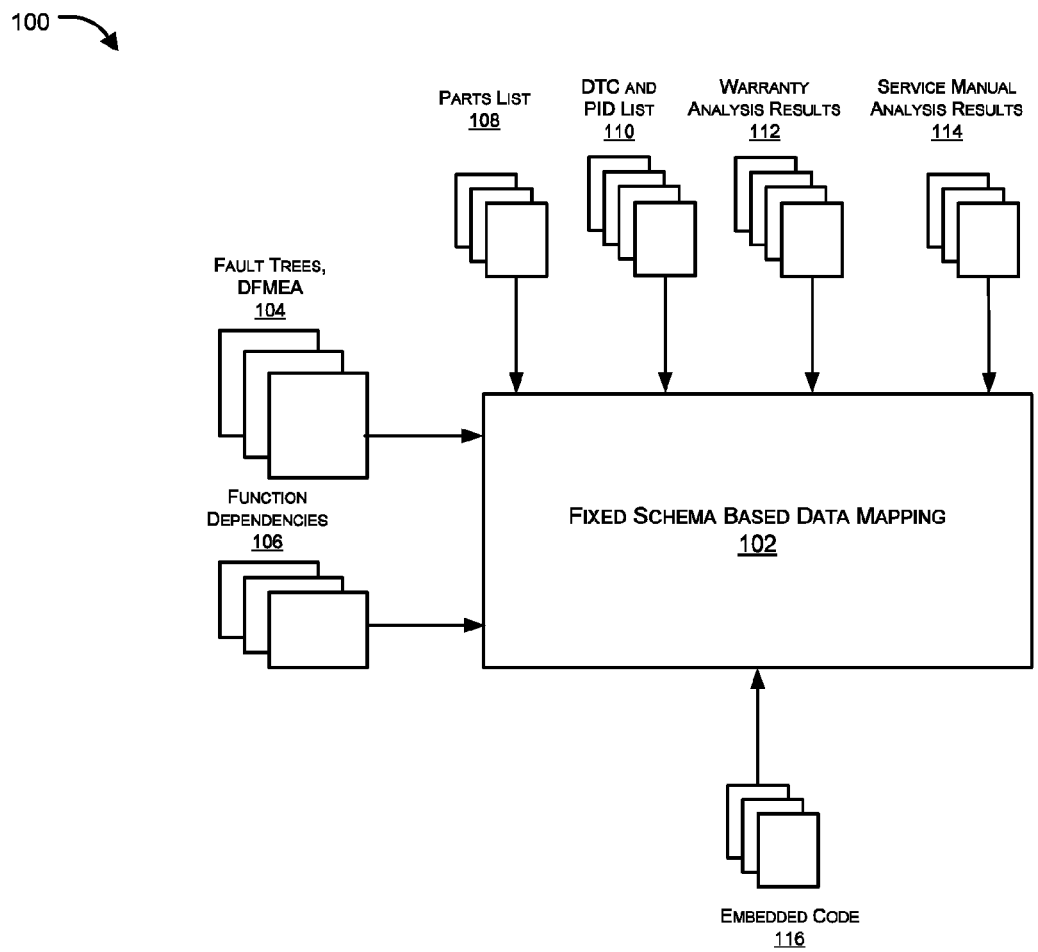
FIG. 1. illustrates an exemplary static model created using predefined schemas according to a known art.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Systems and methods are described to create a comprehensive dynamic model from multiple input data sources in a distributed manner for performing diagnostics and/or prognostics of a complex system that has its modules/parts implemented independent of each other.

In an embodiment, the proposed system for creating a comprehensive connected model of a complex platform can include a non-transitory storage device having embodied therein one or more routines operable to facilitate generation of a connected graph (also interchangeably referred to as connected model); and one or more processors coupled to the non-transitory storage device and operable to execute the one or more routines, wherein the one or more routines can include an input data receive module, which when executed by the one or more processors, receives data (also referred to as content/information) pertaining to the complex platform from a plurality of input sources, wherein the received data can include, but is not limited to, system engineering documentation, software code, maintenance manual, among other content from one or more distributed or centralized input sources.

System of the present disclosure can further include a dependency determination module, which when executed by the one or more processors, analyzes the received data (having, for instance, a plurality of entities/variables received from the plurality of input sources), and determines dependency relations (singular relationships) of the plurality of entities/variables by creating at least one edge list (also referred to as parent-child list). Analysis of received data to identify entities/variables can be used for generating and building a graph database that helps classify and store each entity/variable as either a node (having at least one node property) or an edge (having at least one edge property). Graph database (also referred to as graph db) therefore stores data in a manner such that the data is either a node/node property, or an edge (including edge property) connecting two nodes based on relationship therebetween. Graph relationships therefore have a strong advantage in terms of the fact that they are modelled directly through individual data and not indirectly via a mandatory schema (like in the case of prior art that relies on relational database). Entities/variables that are identified through analysis of received input source/software code data that disclose a relationship having a context can be classified as edges that connect two nodes (say a start node and an end node). Each identified edge can have an associated edge property. Similarly, each node can also be associated with a node property.

System of the present disclosure can further include a connected graph model creation module, which when executed by the one or more processors, creates a comprehensive connected model (also referred to as "connected graph model" or "connected graph") from the at least one edge list. In an exemplary implementation, the connected model can be represented in form of a connected graph. In an aspect, the connected graph can be constructed/amended/modified automatically sooner the graph database is generated and any change in graph database can enable respective changes to be reflected in the connected graph.

In an aspect, once the connected model/graph is constructed/generated, in order to perform diagnostic or prognostics, a network query for a node/entity of interest can be received, and the query can be executed to return all node entities connected to it directly and indirectly and the edges that connect them, thus providing nodes children, children's children, and so on. Additional query logic can be configured to fetch only the nodes and edges in this network with certain properties.

Graph databases allow for node queries, edge queries, node and edge property queries and network queries involving several nodes and possible paths to them. Graph databases also allow for shortest and longest path queries which execute a few orders of magnitude faster than a relational database with much lower memory requirements.

In an aspect, the connected model created can be used for diagnostic and/or prognostics of any complex system designed using modules of different vendors.

A comprehensive model can be created from diverse input data sources, such as specification documents, simulink models, source code, systems engineering documentations, maintenance manual, etc. associated with each individual part/module of the system. The comprehensive connected model as created by the proposed system describes connectivity of different entities related to diagnostics and prognostics such as health indicators, parts, faults, repair actions etc., and provides holistic connectivity and dependency map. This holistic connectivity/dependency map described by the connected graph model is valuable in systems engineering, and can make an excellent source of up to date diagnostic information for different engineering silos that develop their documentation/artifacts independently.

In an exemplary implementation, dependency determination module (YUCCA) can incorporate a comprehensive way to perform software analysis for parsing one type of input (embedded codes) to extract relevant relations to build the model/graph. In an exemplary implementation, Matlab-Simulink or alike higher level software languages can also be used to extract dependency information with ease if the controller code is available in a higher level language such as Matlab-Simulink. The parsed dependency information here describes a network of software variables capable of extracting how each diagnostic trouble code software variable is affected by controller input and output software variables.

In an aspect, system of the present disclosure can be used for MBD to identify and diagnose vehicle troubles. Vehicle Diagnostic information (DTCs) available on vehicle CAN Bus can be monitored to identify fault symptoms.

In an exemplary implementation, connected model can be used for enabling various services such as diagnostics, analytics, prognostics, support for analysis etc. for various stake holders such as Systems Engineers, Calibration Engineers, and Service Technicians.

The present disclosure further relates to a system configured to enable health monitoring of an equipment platform, said system comprising a non-transitory storage device having embodied therein one or more routines operable to facilitate generation and traversal of a connected graph; one or more processors coupled to the non-transitory storage device and operable to execute the one or more routines, wherein the one or more routines comprise: an input data receive module, which when executed by the one or more processors, receives data pertaining to the equipment platform from a plurality of input sources, wherein the received data relates to one or more entities of the equipment platform; a dependency determination module, which when executed by the one or more processors, analyses the received data and determines dependency relationships between the one or more entities by creating at least one edge list, and constructs a graph database comprising one or more nodes and a plurality of edges, each edge of the plurality of edges joining a start node with an end node and defining relationship therebetween; and a connected graph model creation module, which when executed by the one or more processors, creates the connected graph from the at least one edge list and stores said connected graph in the graph database or in a graph library, wherein the connected graph is queriable for any or a combination of a network sub-graph identification, network paths shortest/longest paths, nodes, edges, node properties, and edge properties.

Figure 2:
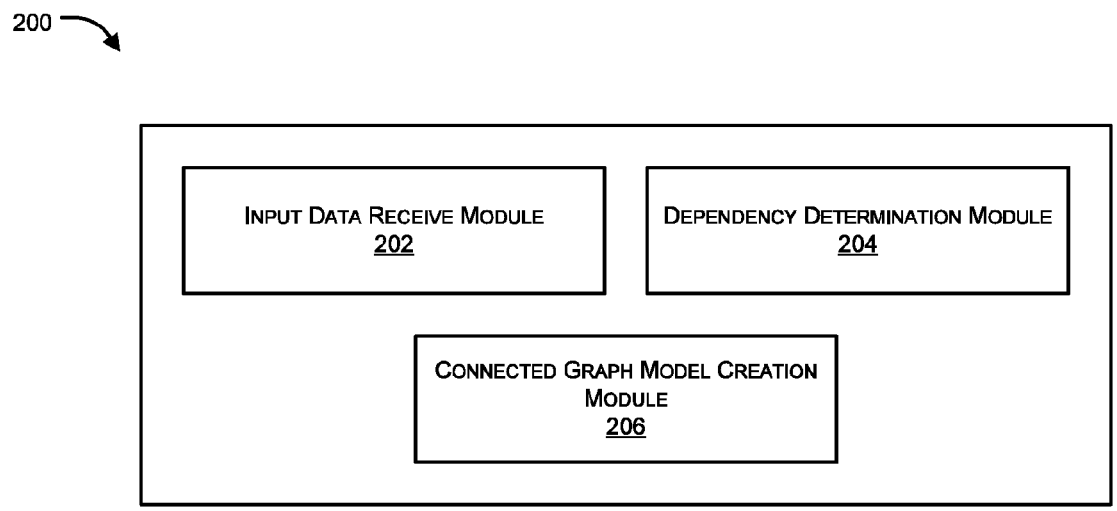
FIG. 2 illustrates functional modules of an exemplary system for creating a comprehensive connected graph model from multiple data sources in accordance with an embodiment of the present disclosure.

FIG. 2 illustrates functional modules of an exemplary system for creating a comprehensive dynamic connected model from multiple data sources in accordance with an embodiment of the present disclosure. In an aspect, the system can include an input data receive module 202 configured to receive data/content/information from one or more input data sources (such as documentations, user manuals, technical specifications, among other content repositories/documents) that are associated with different modules/sub-systems of a complex platform; a dependency determination module 204 configured to analyse a plurality of entities/variables that form part of the received data/content/information from one or more input data sources and determine all dependency relations (all singular relationships) of the plurality of entities/variables by creating an edge list so as to create a graph database; and a connected model creation module 206 configured to create a comprehensive connected/graph model (connected graph) from the edge list based on the graph database. In an exemplary implementation, the connected model can be represented in the form of a connected graph.

In an aspect, system of present disclosure can be used for model-based diagnostics (MBD) to identify and diagnose vehicle troubles. Vehicle Diagnostic information (DTCs) available on vehicle CAN Bus can be monitored to identify fault symptoms.

In an aspect, an exemplary model generated by a system in accordance with an embodiment of the present disclosure can include a plurality of rows, where each row of the exemplary model can be construed as a connected sub-graph describing connections between diagnostic trouble codes (DTCs) mentioned in first column with part names mentioned in subsequent corresponding columns. In an aspect, accuracy of the proposed model generated by the system can be verified based on customer's service manual, and it can observed that the created model does produce all relevant parts in the service manual and more. Additional (more) parts that do not appear in the service manual have also been verified to be correct.

In an exemplary embodiment, system 200 can be implemented in a distributed manner (by incorporating input data sources from multiple servers/cloud or computing devices that are configured across one or more networks) using cloud based resources and cloud based input data sources. In another aspect, system 200 can be big data compatible in the sense that the data can be stored as a long list instead of a structured DB (with schema). The data list can be partitioned and stored on different computers in a distributed manner. A query can be distributed on the computers so as to bring computation to data instead of bringing data to computation or needing to parse it extensively.

As one may appreciate, cloud based resources enable the proposed system to add additional computing resources/servers as needed for additional performance.

In an exemplary aspect, system 200 creates a connected graph model from a graph database that can be used for "diagnostics" application. As one may appreciate, no fixed schema is used for data compilation, and therefore the system 200 provides more flexibility as compared to the conventional DB approach. System 200 also requires less amount of data parsing as there is no fixed schema. System 200 allows input data to be captured in detail from multiple sources. System 200 can also use highly robust method (Graphing) for model development.

In an exemplary embodiment, system 200 performs Comprehensive Software dependency analysis (using, for instance, YUCCA (Ref to 2513/MUM/2008 and 2559/MUM/2008 for further details on YUCCA), which is a Sequential to Parallel automatic code conversion proprietary tool developed by KPIT Technologies Ltd.) so as to create the proposed model. As one may appreciate, all variable dependencies are captured after variable read write analysis, wherein function pointer analysis is subsequently performed to increase accuracy of variable read write analysis and collect all possible relations, wherein the variable dependency is not based on simple text (text matching) search but rather based on code analysis. In an exemplary implementation, system 200 handles macro variables to ensure collection of all variable relations. The system 200 considers condition variables as influencing variables for variable relations.

In an embodiment, system 200 can be configured for vehicle fault diagnosis, wherein the system can be configured to extract all entities (vehicle health related information) from input data sources (user manual, software codes, documentation, etc.), analyse the entities using big data approach to generate directed and connected graph specifying relationships between parent(s) and child(ren); and enable diagnostics/prognostics (vehicle fault diagnostic and prognostic) to detect or predict fault in a complex system based on processing of the connected graph. In an exemplary implementation, sub-graphs of the connected graphs can be created on different computers.

In an aspect, it is to be appreciated that the data received by the proposed system (on which dependency analysis is performed) may be in the form of a source/software code pertaining to different vehicle functionalities that need to be analysed to form the proposed connected graph. The source code can therefore be analysed to determine the dependencies (also referred to as dependency relationships). In a further aspect, the proposed system therefore analyses one or more input sources (such as testing/validation manuals or DTC manuals) along with the source code in order to provide desired diagnosis.

In another aspect, the received data can include lists of different vehicle parts, or wiring/hydraulic diagrams, or .odx (Open Diagnostic eXchange) files providing access to diagnostic information/data/services, business service documentation, documentation related to common services, service manuals, Enterprise Resource Planning (ERP) data, data pertaining to different application services such as stream analytics, cross analytics, warranty/reliability, among other information/data pertaining to various entities/variables that form part of or are operatively coupled with the vehicle.

Figure 3:
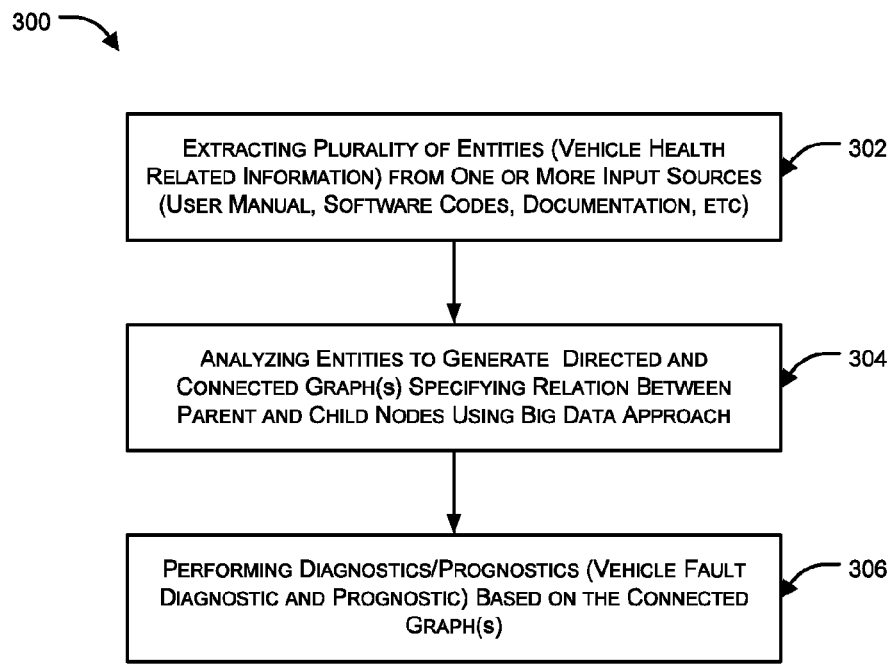
FIG. 3 illustrates flow chart of an exemplary method for creating connected graph model for enabling diagnostics and prognostics of a system in accordance with an embodiment of the present disclosure.

FIG. 3 illustrates flow chart of an exemplary method for creating connected graph model for enabling diagnostics and prognostics of a system in accordance with an embodiment of the present disclosure. As shown in FIG. 3, the method includes the steps of extracting plurality of entities (vehicle health related information) from one or more input sources (user manual, software codes, documentation, etc.) as shown at step 302, analyzing entities to generate directed and connected graph(s) specifying relation between parent and child nodes using big data approach as shown at step 304, and performing diagnostics/prognostics (vehicle fault diagnostic and prognostic) based on the connected graph(s) as shown at step 306. In an exemplary implementation, sub-graphs of the connected graphs can be generated on different computers.

In an exemplary implementation, using the method 300, connected-chain of entities for each specified parent element (specified either by a user or automatically by the proposed system/model) can be extracted using the parent-child data list mapping. A lookup (MAP) for children can be brought to a location where next entity information is present and processed locally on a data storing computing device. Results received for children from all connected computing devices can be reduced to a Chain and new Parent for the next iteration can be created. The iterative process can identify all connections to a specified parent. In an exemplary implementation, iterative process could be implemented in big data map-reduce structure for identifying connected graphs from data. In an exemplary implementation, the connected graph can be implemented in, for instance, open source Apache Hadoop as Giraph to accomplish a large scale connected graph. It is to be appreciated that the proposed graph can be implemented in any other software framework for distributed storage and distributed processing of large data sets on computer clusters built from commodity hardware, and all such possible implementations are well within the scope of the present disclosure.

Figure 4:
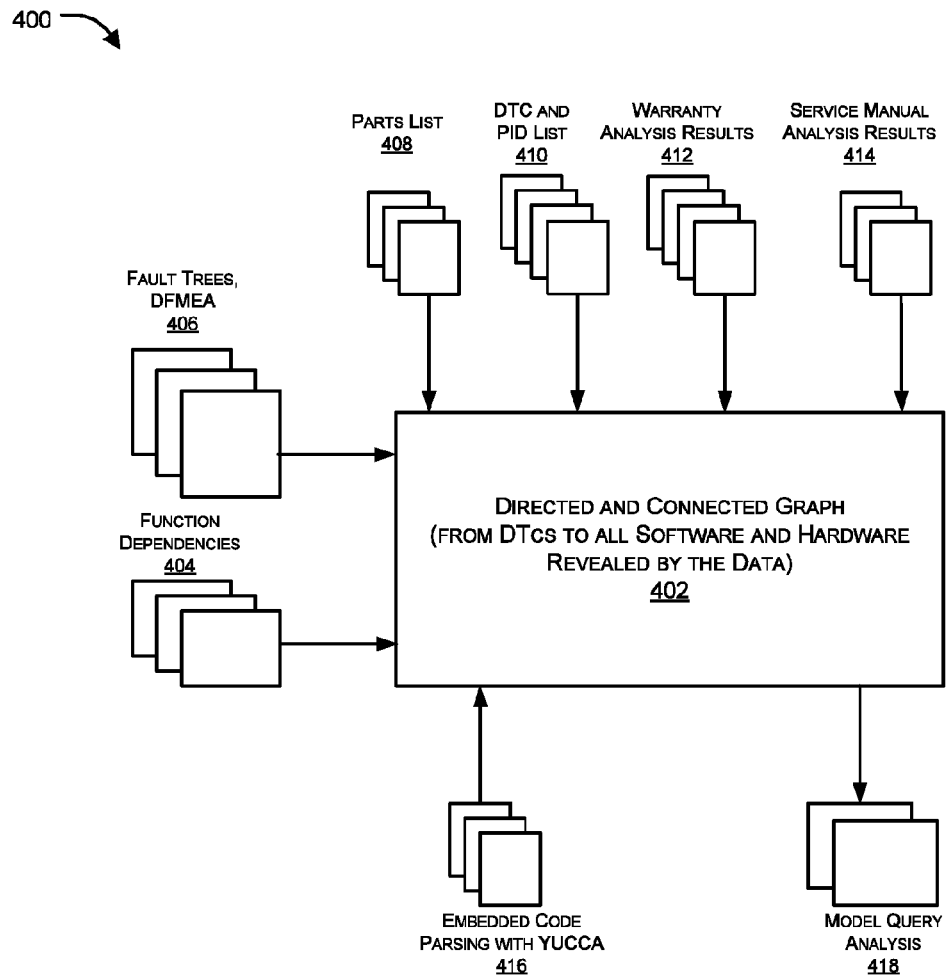
FIG. 4 illustrates an exemplary system for creating a comprehensive connected model from multiple data sources in accordance with an embodiment of the present disclosure.

FIG. 4 illustrates an exemplary system for creating a comprehensive dynamic connected model from multiple data sources in accordance with an embodiment of the present disclosure. As shown in FIG. 4, system 400 (using module of system 200) generates a directed and connected graph 402 from DTCs for all discovered hardware and software entities. In an exemplary implementation, system 400 creates/generates a directed and connected graph 402 by analysing entities retrieved/discovered by parsing input data sources such as fault trees/DFMEA 406, part list(s) 408, DTC and PID list(s) 410, warranty analysis results 412, service manual analysis results 414, embedded code 416, parts library, audit trail and history, among other like input sources, and performing analysis such as model query analysis 418, and function dependencies 404 so as to generate the directed graph 402. In an aspect, the system 400 can, based on directed and connected graph 402, facilitate model query analysis 418.

In an aspect, once the connected model/connected graph is prepared, in order to perform diagnostic or prognostics, a recursive query (code) can start with an entity of interest (referred to as parent entity/node), and search for its children and then its children's children and so on until an exhaustive search provides all the connected entities and the data list has no more data to continue to find more children.

As shown in FIG. 4, the system can extract all relevant knowledge from one or more input sources such as Systems engineering documentation. Software code, maintenance manual, etc. and can create a connected graph to serve as a model. In an exemplary implementation, connections (edges) between entities can be made depending on the information contained within inputs. Moreover, vertices (entities) appearing in one input source may appear in another input source as well, making connections across input sources and linking multiple input sources. In an exemplary implementation, all raw documentations/inputs serve as data for generating this connected graph, hitherto referred as the model or connected model. The system extracts potential edges of interest from customer documents and creates a long parent-child list. In an exemplary implementation, a script can be used to extract chain of all connected edges, given a starting vertex (entity) of interest. A sub-graph of interest can similarly be extracted for any given entity.

In an exemplary implementation, on receiving input data (customer data), system 400 can perform YUCCA Software Dependency analysis on input data, for example source code, to produce a parsed output in Parent-child list format where each row describes which parent variable is affected by which child variable from a line of code. As there may be several code variables that are internal to the code only and do not represent any input or output from a controller, the system can append this list with several other tables provided as input data source, for example a table as shown in FIG. 5. As one may appreciate, order in which different entities are appended or if some disconnected data is appended to this long list does not make a difference to the final result. The long list can be a comprehensive list from the input data of all possible edges of interest. In an exemplary implementation, the system enables prognostics or diagnostics by starting with a DTC (Diagnostic trouble code) of interest and using the code (flowchart described in the disclosure document) to extract sub-graph of interest. The system can receive a list of DTCs of interest from a customer and make a comprehensive connected model encompassing these DTCs.

In an embodiment, all potential vertices and edges of the connected graph are to be gleaned from input data (also referred to as customer documents). In an implementation, the proposed system can use YUCCA (or any other Sequential to Parallel automatic code conversion tool) to parse code (input source) flashed into a controller to determine edges between DTCs (decision to set/reset them is entirely made in the code) and software variables that act as controller input and output. The system can be configured to use customer provided tables (engineering documentation) and determine which columns of the table may contain vertices and edges of interest. The system can determine which columns may contain some platform health related information. Depending on document format, information extraction can involve document parsing, for example, in case of software source code. Similarly, a word document written in a natural language could be parsed using natural language processing (NLP) to extract potential graph related information (vertices and edges).

FIG. 5 illustrates an exemplary variable dependency table created based on software analysis in accordance with an embodiment of the present disclosure. As shown in FIG. 5, table 500 includes a parent column 502 that lists parent entities and child column 504 that lists direct child entity of a corresponding parent entity. In FIG. 5, in an exemplary implementation, if VA5 is given as the starting vertex (parent node), the proposed system, using the parent-child list/graph/model, traverses all edges connected to VA5 and finds the connected vertices and all vertices connected to the connected vertices downstream. Example dependency graphs for VA5 can include entities (vertices) VA4, VA6, VA7, VA8, VA9, VA53 and 8; where VA4. VA6, and VA7 are direct children for parent node VA5; VA53 and 8 are direct children for VA7; and VA8 and VA9 are direct children for parent node VA6.

Figure 6A:
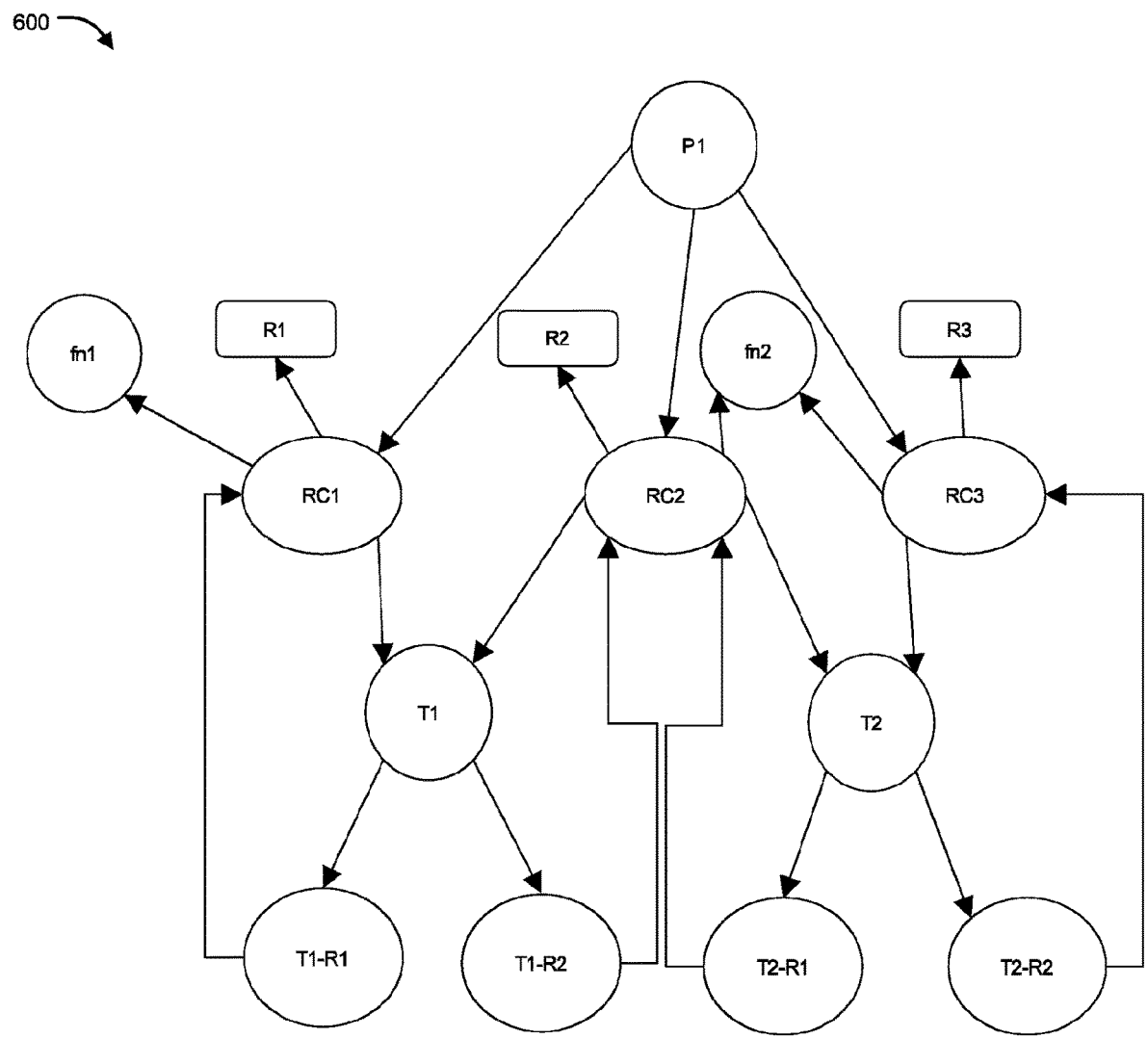
FIG. 6A illustrates an exemplary sub-graph generated in accordance with an embodiment of the present disclosure.

FIG. 6A illustrates an exemplary connected sub-graph 600 for a part P1 of a vehicle, where P* refers to part(s), fn* refers to affected function(s), R* refers to corrective action(s), RA* (not shown) refers to repair action, RC* refers to point failure/failure mode, T* pertains to Test, and T*-R* pertains to Result R* of Test T*.

Figure 6B:
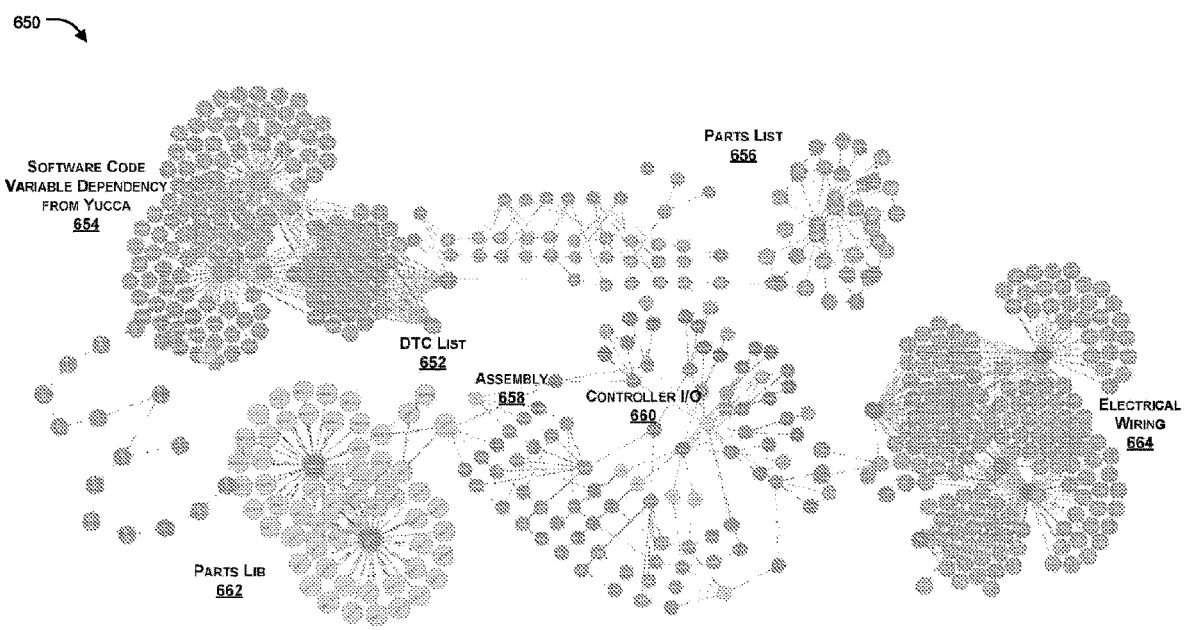
FIG. 6B illustrates an exemplary connected graph generated in accordance with an embodiment of the present disclosure.

FIG. 6B, on the other hand, illustrates a connected graph 650 generated by connecting multiple sub-graphs, a first sub-graph 652 generated based on DTC list, a second sub-graph 654 generated based on software code variable dependency from YUCCA, a third sub-graph 656 generated based on part list, a fourth sub-graph 658 generated based on assembly, a fifth sub-graph 660 generated based on controller I/O, a sixth sub-graph 662 generated based on parts common domain knowledge about part failures across customers, and a seventh sub-graph 664 generated based on electrical circuits. Such a connected graph 690 can then be audited and queried based on nodes, edges, their properties and connecting network paths in order to extract required sub-graphs or needed information. In an aspect, either each sub-graph can have its own sub-graph database, which can be aggregated while generating the connected graph 650, or in another alternative implementation, a single graph database can be generated for all the sub-graphs together, both of which are exemplary implementations and any other mode of generating graph database and presenting a graph model based thereon is completely within the scope of the present invention.

Systems and methods of the present disclosure extract entity information and create connected graph of a given complex platform showing dependency of entities retrieved from one or more data sources. In an exemplary implementation, systems and methods of the present disclosure can be used to generate machinery health related information of a vehicle.

As one may appreciate, in connected graphs created by the proposed system, there is no need for a priori schema. Connections in such a connected graph can be made from input data source, wherein the connected graph, once generated, may reveal some schema pattern. The proposed system does not require that the diagnostic information should fit a certain schema structure.

In an aspect, the proposed system produces comprehensive connected graphs for given input data with highly detailed connected information for the model when compared to fixed schema based DB method that produces sparse and not so detailed model from same input data.

As one may appreciate, systems and methods described here provide a scalable (with big data and distributed query implementation) and exhaustive model building approach with recursive query. Model created is stable and needs very little documentation parsing compared to existing approaches. System and method of the present disclosure is not limited to a fixed schema, and therefore is more flexible than the DB approach. In order to fit the data to a rigid schema, one needs to precisely parse the data, which increases parsing work and also results in inability to capture all the relevant detail in the data. The proposed architecture/system, on the other hand, is more flexible, needs less parsing, and yet is able to produce more detail with ease. Also, in an existing typical structured DB approach, all the data is typically required to be stored in one DB that is stored on one server, which limits how much of data, model, and querying can be handled by the one computational resource, which also becomes vulnerable to crashes and data loss. The proposed system and method, on the other hand, uses big data approach where the data and the graphs can be distributed on different computers. In exemplary implementation, large scale graphing or modeling can be created using system of the present disclosure. For example, in applications like social media and other industries, Giraph or any such other graph databases can be used to store and query a connected graph from customer/industry/specification provided data. NetworkX, OrientDB, Neo4j are some other graph databases for smaller graphs. In an exemplary implementation, system of the present disclosure could be implemented on any of these type of graph databases depending on the problem size and need which makes it fully scalable.

Figure 7:
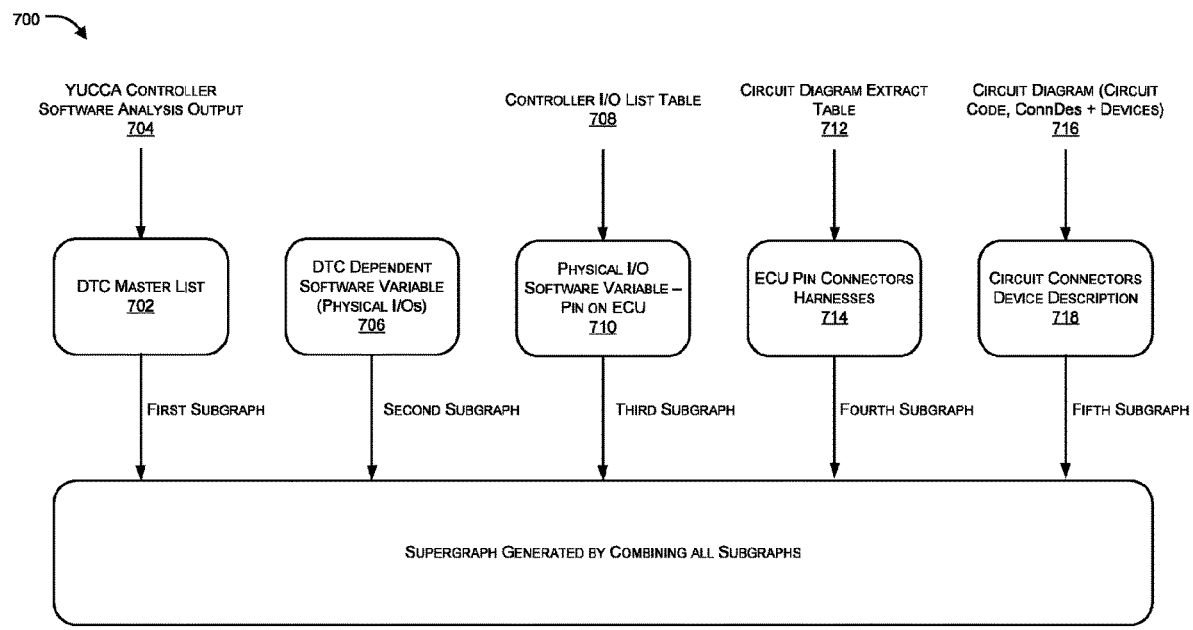
FIG. 7 illustrates how sub-graphs can be created and then processed together to generate a supergraph in accordance with an embodiment of the present disclosure

FIG. 7 is a diagram 700 showing how sub-graphs can be created and then processed together to generate a supergraph in accordance with an embodiment of the present disclosure. As can be seen, a first sub-graph can be created when DTC master list 702 is processed based on a YUCCA controller 704 in order to give a list of nodes connected by edges based on relationships between the nodes, wherein the nodes and edges are stored in a graph database. A second sub-graph can be generated based on DTC dependent software variables 706. A third sub-graph can similarly be generated based on physical I/O software variables 710 being processed using controller I/O list table 708. Another exemplary fourth sub-graph can be generated based on processing of ECU Pin connectors 714 as input based on circuit diagram extract table 712. A fifth exemplary sub-graph can be generated based on processing of circuit connectors and device description 718 using circuit diagram 716 having circuit code, connection description, and devices. All such generated sub-graphs can then be aggregated so as to generate a supergraph as shown in FIG. 6B.

Similarly, in another exemplary implementation, customer vehicle data such as SDA, IO, and circuit diagrams can be used to generate a first graph database and resultant sub-graph (showing edges and nodes), customer vocabulary such as part naming convention can be used to generate a second graph database and resultant sub-graph (showing edges and nodes), domain knowledge across customers can be used to generate a third graph database and resultant sub-graph (showing edges and nodes), and finally all three sub-graphs can be combined to generate a combined/super graph.

Figure 8:
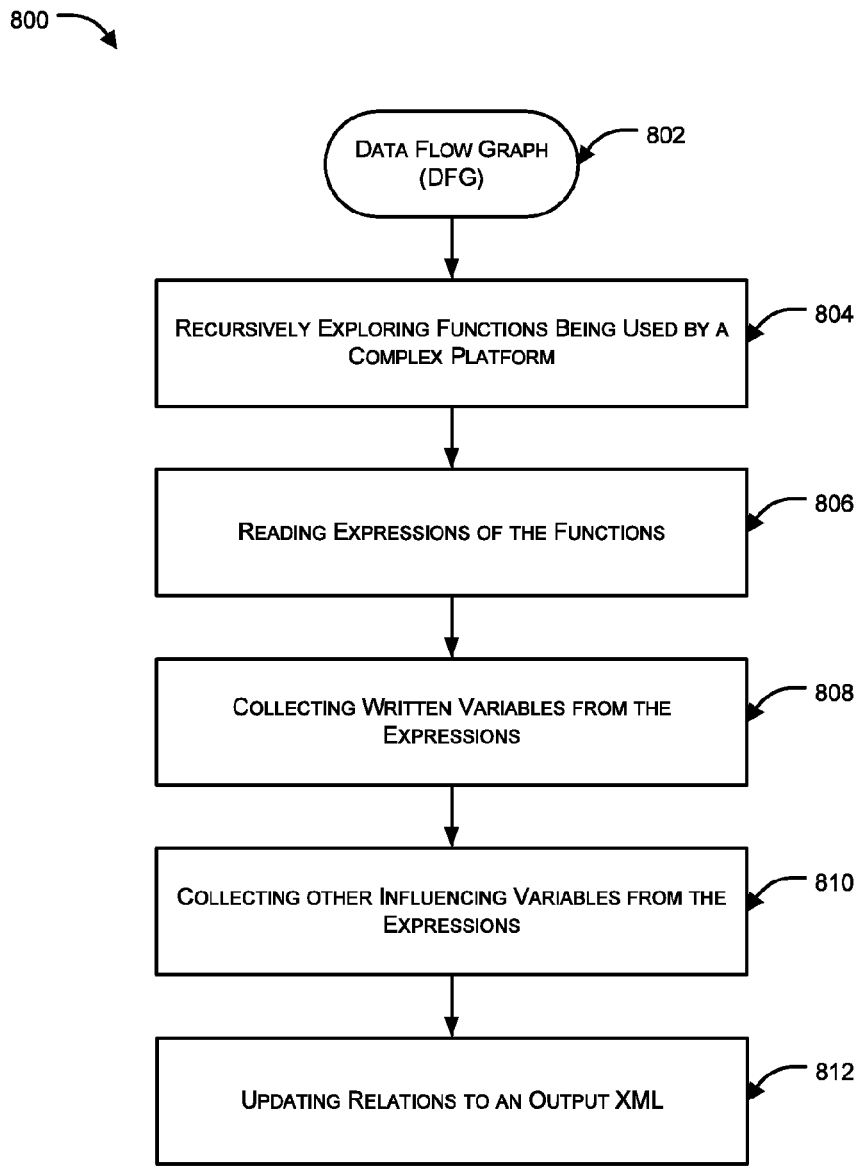
FIG. 8 illustrates an exemplary flow of variable dependency analysis in accordance with an embodiment of the present disclosure.

FIG. 8 illustrates an exemplary flow diagram 800 showing variable dependency analysis in accordance with an embodiment of the present disclosure. As shown in FIG. 8, the method for performing variable dependency analysis (VDA) for a given data flow graph (DFG) 802 can include steps of, recursively exploring functions being used by a complex platform as shown at step 804, reading expressions of the functions as shown at step 806, and collecting all written variables from the expressions as shown at step 808. The method can further include the steps of collecting other influencing variables from the expressions (such as regular expressions) as shown at step 810, and updating relations to an output xml as shown at step 812.

Figure 9:
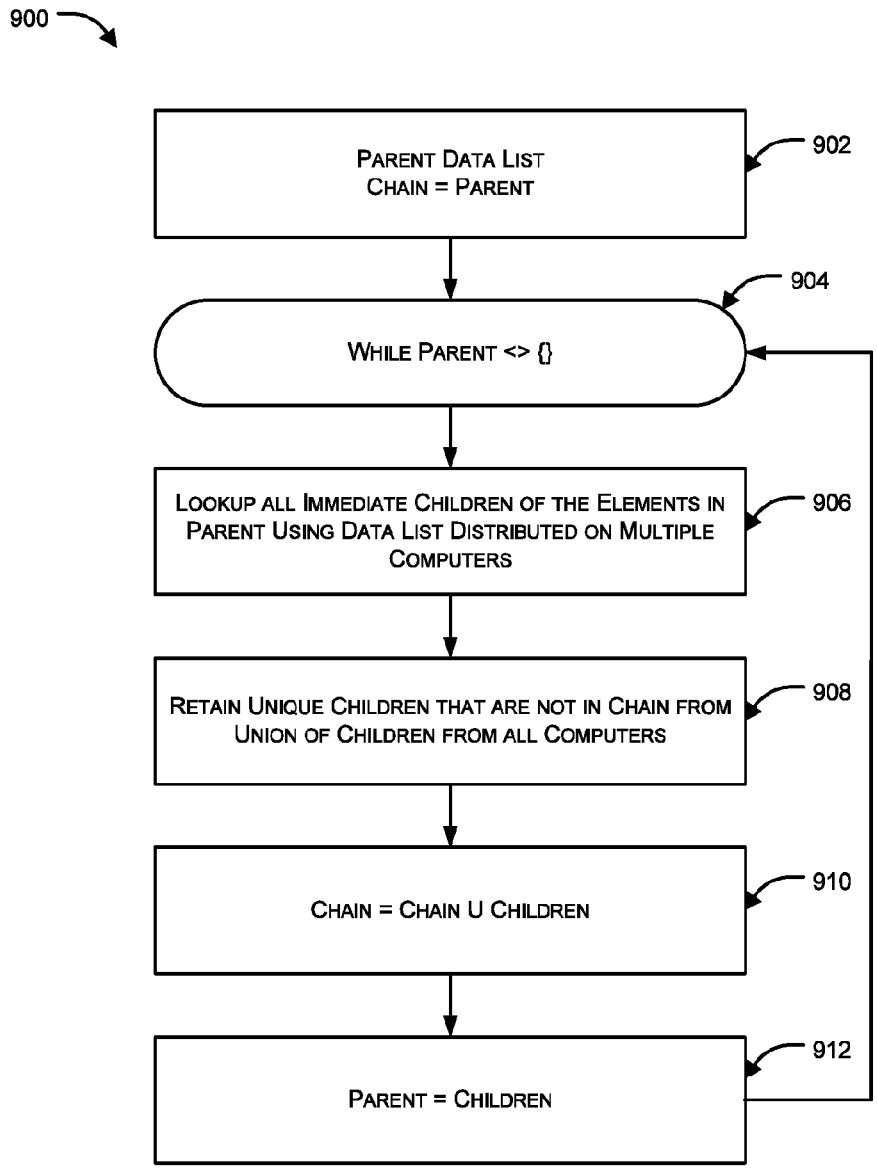
FIG. 9 illustrates an exemplary flow diagram that can be used to create connected chain of entities in accordance with an embodiment of the present disclosure.

FIG. 9 illustrates an exemplary flow diagram 900 that can be used to create a connected chain of entities for a given parent in accordance with an embodiment of the present disclosure. In an exemplary implementation, the connected chain of entities can be created after parsing input data and retrieving relevant entities/variables. As shown in FIG. 9, for a given data list where chain is to be formed for a specified parent node as shown at step 902, the proposed method can recursively check (till a parent exists i.e. a parent value is not NULL) if the parent entity has any other child as shown at step 904, and lookup for all immediate children of the parent node using the given data list distributed on multiple computing devices as shown at step 906. The method can then retain unique children that are not in the chain by performing a union of children obtained for the parent node from all computing device as shown at step 908. The method can then update the chain as a union of chain and identified/retained unique children as shown at step 910. At step 912, the identified/retained unique children are made as parents for the next iteration, and the steps 904 to 910 are recursively carried out till condition mentioned in 904 exists, i.e. till a potentially assigned parent node exists.

Figure 10:
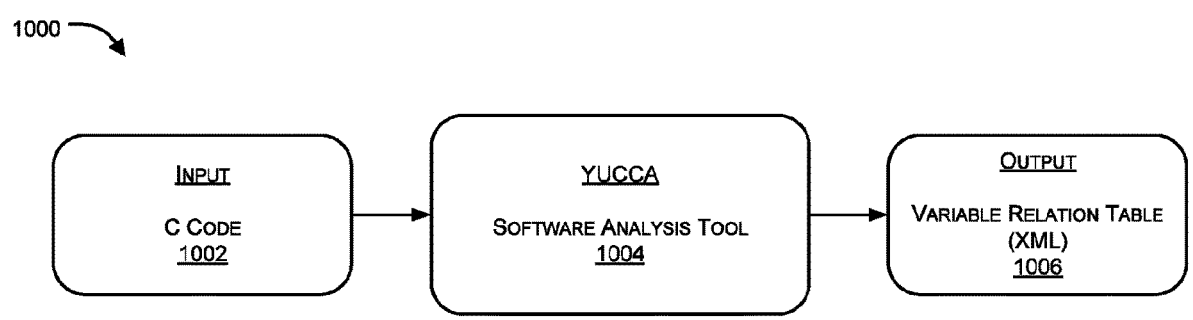
FIG. 10 illustrates an exemplary block diagram for extracting entity information from data source and creating variable relation table in accordance with an embodiment of the present disclosure.

FIG. 10 illustrates an exemplary block diagram 1000 for extracting entity information from data source(s) and creating variable relation table based thereon in accordance with an embodiment of the present disclosure. In an exemplary implementation, upon receiving input data 1002 (for example C code), the proposed system can perform YUCCA Software Dependency analysis using YUCCA software analysis tool 1004 on the received input data 1002. Although exemplary embodiments of the present invention have been described with respect to YUCCA dependency analysis, any other similar analysis tool can be used. In an exemplary implementation, after performing dependency analysis, the proposed system can output a variable relation table 1006 that can be stored in the form of, for instance, an XML or as a logical table as shown in FIG. 5.

In an exemplary implementation, input 1002, for example a source code, can be processed by YUCCA to generate a parsed output in the form of a Parent-child list format where each row describes which parent variable is affected by which child variable from a line of code. As there may be several code variables that are internal to the code and do not represent any input or output from a controller, the system can append this list with several other tables provided as input data source.

In an aspect, the proposed system can receive a C-code, which may contain different programming entities like variables, arrays, conditional statement, loops, pointers, function pointer, function calls and definitions, system calls etc., and generate an XML file as output that contains dependency mapping. The XML may include two sections, wherein one of these sections can include first order relations between variables. A simple output example is shown in Ex 1 hereunder. The final output would not have direct variable names as shown in the example, instead they can be represented with variable IDs to differentiate variable with similar names and different visibility. The system can retrieve variable names and other properties like declaration location, file name, variable type from the second section (Meta data) of the same XML file.

Ex 1:
consider a statement "aa=bb+cc;"
Variable "aa" is influenced by both variables "bb" and "cc".
So the output generated would have the following records

| Dependent | Influencing |
|---|---|
| Aa | bb |
| Aa | cc |

In an exemplary implementation, systems and methods described above can be used for performing system analysis, which requires analysis of complete code for variable updates, pointer resolving, control flow, and data flow. This is a complex process and therefore the software can be divided into two modules: 1) Front end, 2) Back end.

Front End: Code Scanner and Parser

To perform front end analysis using system of present disclosure, input C-Source code can be scanned and parsed to identify tokens (such as function names, variables, pointers etc.) and map their information (such as declaration file name, line number etc.). These relations can be put into an XML file (for instance) for further use. The back end can also handle compiler directive.

Back End: Code Analysis

To perform back end analysis, also referred to as code analysis, using the system of present disclosure, XML file generated by the front end can be given as input and the system can produce CFG (Control Flow Graph) and DFG (Data Flow Graph) from the XML file. Each and every statement in the DFG can be analyzed to produce intended variable relations output.

Figure 11A:
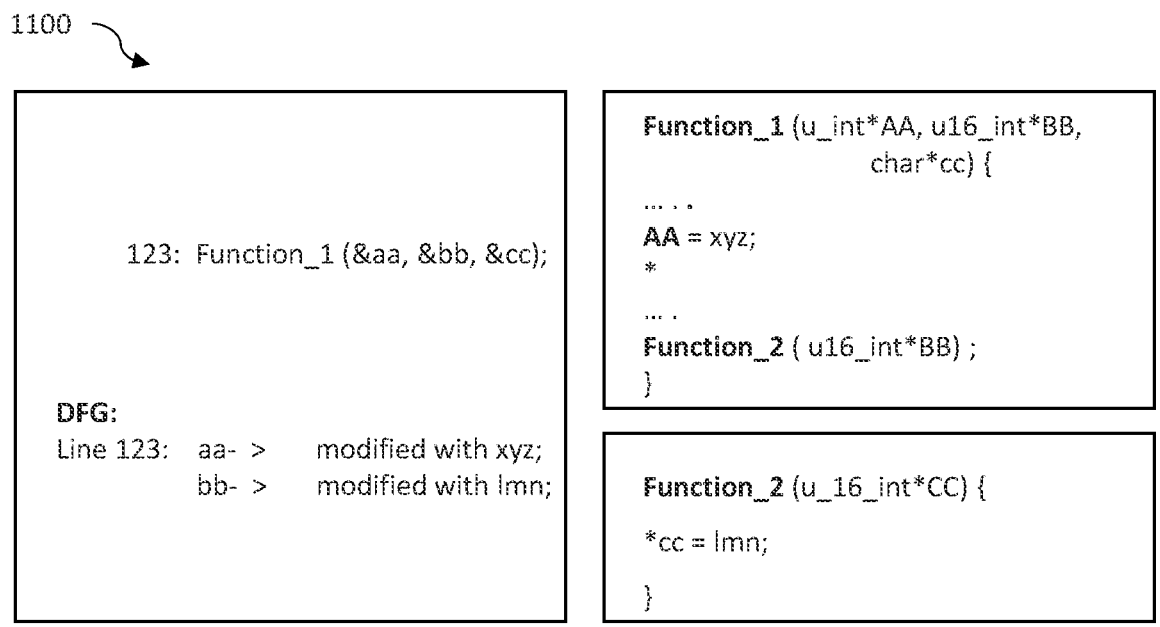
FIG. 11A provides an example where variable can be written or modified.

Data Flow Graph (DFG) generated may have a lot more data than just variable names and operations. It can include information related to variable being modified at a particular statement. To be precise, when a function call is encountered with arguments that are passed by reference, the module analyzes the called function to find out if the passed argument is modified inside the function call. If it is modified, the variables are marked as modified. The module is powerful to identify variable write/modification at any level of function calls. FIG. 11A provides an example 1100 where variable can be written or modified.

In an exemplary implementation, DFG module can deduce pointers and function pointers too. Therefore, while processing expressions in VDA (Variable Dependency Analysis), we can see which value is actually influencing or depending on other variables, rather than blindly looking at pointer variable. Therefore, the DFG is not based on simple text search but on in-depth analysis of the code. Software analysis requires analysis of complete code for variable updates, pointer resolving, control flow and data flow.

The system can perform variable dependency analysis using method explained in FIG. 8. As shown in FIG. 8, the system receives a DFG tree structure that may have a similar structure to a program. It has functions and the statements/expressions inside these functions represented in a linked list. The function present in the first level of DFG tree can be parsed one after the other till there are no more functions remaining. Expressions inside a function can be linked under the function block of the DFG tree. Each expression can be analyzed to identify Dependent and Influencer variables. Once all the variables are collected, system can put these variables into an XML file, for instance.

Dependent and Influencer Identification

In an exemplary implementation, the proposed system can identify dependent variables and influencer variables. A dependent variable is a variable that is being modified in the code expression. Influencer variables are ones that collectively produce a value that is assigned to the dependent variable. The system can use different scenarios to identify dependent and influencing variables. 1) Simple Assignment expressions, 2) Conditions, 3) Function calls, 4) System calls, 5) Compiler Directives.

1. Simple Assignment Expressions

These are basic and straight forward variable modifying expressions. Identifying a dependent variable is as simple as finding the LHS of the expression. All the variables on the RHS are influencing variables. If there is a function call on RHS, then the return variable and the parameters passed to that function are going to influence the LHS. It is to be noted that the argument variables that are read inside the function are only going to be added as influencing variables and remaining unused arguments can be discarded.

2. Conditions

Statements inside a condition block are going to be executed only if the condition satisfies. Therefore, variables used inside the conditions are actually influencing all dependent variables found inside these condition blocks. This applies to "else block" too as the block is executed only if the condition variables influence to make the condition fail. In case of nested if-else blocks, all preceding condition variables in different parent blocks are considered to be influencing variables. The same applies to all switch blocks.

3. Function Calls

Function calls could be found automatically without catching return value or within an expression. Both are handled to detect dependent and influencing variables. During a function call, statements inside the function definition are going to be executed. Therefore, though it may not be possible to find internal operations at the call site, it may need to be assumed that the operations are inline. When a function is called automatically, it is important to check pointer arguments that are passed by reference. These parameters are checked for modification inside the function and considered to be dependent variable at the call site line number. This analysis is also performed even if the function call is inside an expression. The expression could be a condition in "if" or assignment operation.

4. System Calls

System calls are Operating System (OS) requests from a program. Body of these functions/calls are generally not provided by the client and therefore it is possible get the functionality of these system calls to manually handle the relations. The relations needed to get can be among the arguments and also between the arguments and the return value of the system call. These relations are automatically added when known system calls are found.

Ex 3. Report_Error(ERROR_ID_234):

Such a system call is quite common and necessary to identify issues in ECUs. General functionality of this call is to update global Error Status to an error id passed as argument. In this case, global Error status is updated with ERROR_ID_234.

5. Compiler Directive

Figure 11B:
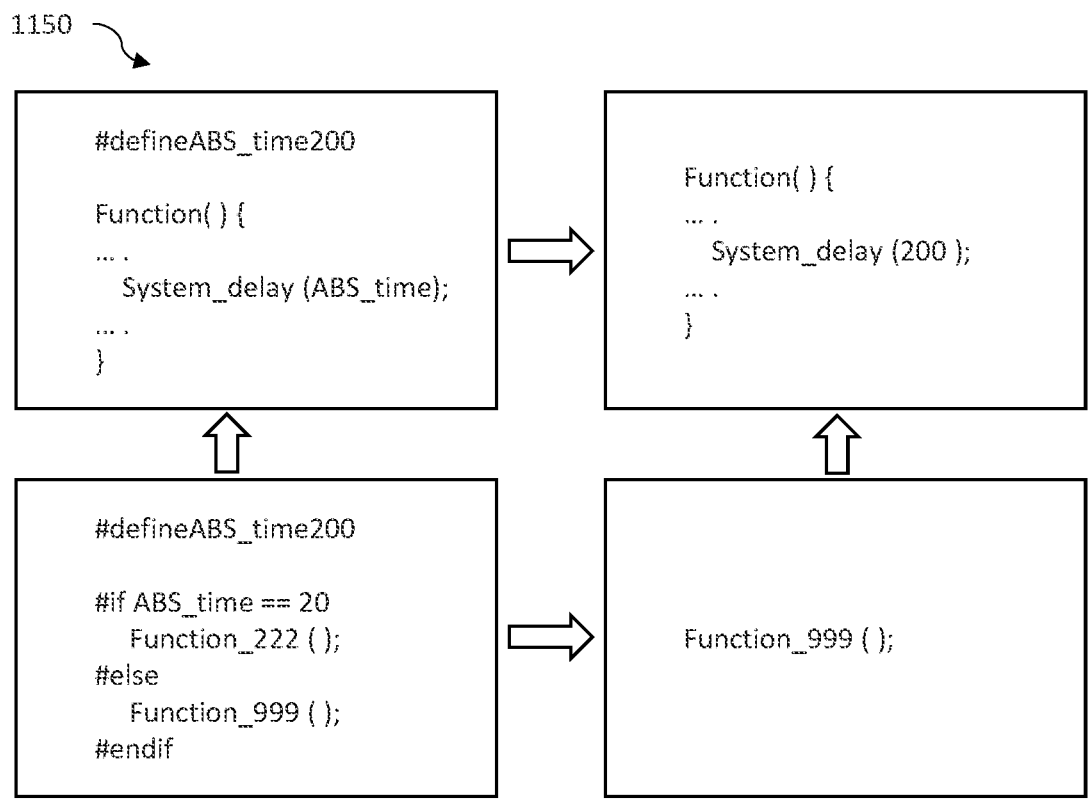
FIG. 11B illustrates an example code selection using directive.

Compiler Directive gives convenience of configuring code with a little code modification. To recap, compiler directives set the code that needs to be compiled. There could be constants and functions that are resolved during the compile time based on the compiler directives. The front end (scanner & parser) resolves these compiler directives and provides actual code that is going to be executed. FIG. 11B illustrates an example code selection 1150 using directive.

It is observed that most of the developers use these directives to have performance improvement and manageability. However, in such cases, system can miss some of the variables/macros during front end processing. In order to maintain consistency in program analysis, system of present disclosure does not manipulate compiler directives during processing but handles these Macros as a separate procedure parallel to the front end.

In an aspect, the proposed system can collect locations of Macro usage and use them as influencing variables at corresponding expressions. It is safe to assume that Macros are always influencing and never dependent because they are always constants and modification of these variable at runtime is not possible.

As one may also appreciate, since the proposed system parses complete code to do variable dependency check, the system may have much more information than just the variable dependency. For example, system can have line-number of a particular dependency. Similarly, the system can collect file name, parent function, condition nesting level etc. for every dependency. This information can help in further analysis and can be provided in the output XML based on the requirement.

Further, it is important to abstract the conceptual type of variable to identify association of the variable with a particular sub-system of the vehicle. For example, it is preferred to know if an error has occurred due to CAN message or due to internal physical pin value of a particular ECU. Abstracting the conceptual type of a variable is not possible based on code analysis due to lack of standard information in code. However, it is observed that developers maintain good naming conventions of variables for manageability. In an exemplary embodiment, the proposed system can utilize this information to identify variable type. System can get naming conventions from developers and use pattern matching to identify individual variable type. Categorizing of variables is not possible if developers are not maintaining a coding convention or if some individual developer misses to follow their conventions.

As one may observe, there are certain system level variables that are used across a vehicle system for inter-communication. Such variables are standard and specific to each system (for example, vehicle), and are also usually properly documented. Developers typically provide these conceptual-type variables as a pair in a text file, based on which the proposed system can make use of these files during analysis to populate in XML file as model.

It would be appreciated that although the present disclosure has been explained with respect to applications in vehicle health assessment/diagnosis/prognosis/management, connected graphs of the proposed invention can be used in any other application as well, and all such applications are well within the scope of the present disclosure.

In an aspect, the proposed connected graphs that are generated based on dependency analysis of one or more entities, and reflect relationship between entities and associated variables can be used in system engineering applications across industry/technology verticals such as in software system engineering, data analytics, financial transactions, blockchain transactions, big data, among other like applications. For instance, the connected graph can be used to identify connectivity breakdowns and help resolve them, wherein while building the connected graph model, data from different input sources can be imported in to graph database, wherein since these input sources are developed in different engineering silos, one or more data nodes from a first engineering silo may not connect to the data in a second engineering silo as it would be expected based on logic or systems engineering understanding. For example, a DTC node for a particular voltage sensor from the software code may not connect to that voltage sensor obtained by importing wiring diagrams. As they are however expected to connect, this connectivity breakdown may happen due to missing, inconsistent, or bad data form either input sources. In an aspect of the present disclosure, the proposed graph database can, in such a case, be easily queried to find out connectivity of the sensor to other nodes, and also could be queried to find the network of the DTC to determine where they should have connected and then look for the reason why that data was not available in the input sources, which can lead to correction and improvements to engineering input sources and systems engineering methods and practices in order to capture important data correctly.

Aspects of the present disclosure can further be used to develop interface (connectivity) models, wherein when the proposed connected model/graph is ready, one can query the model to determine how one part, subsystem, or system within the model connects to another. The query result can describe needed connectivity information that can serve as an interface model in systems engineering to keep teams working on different systems that connect to each other on the same page and connected. If one team is expecting a certain signal from another team via this interface, and it is not available in this interface, it can be readily be seen in this interface model and designs could be rectified.

Aspects of the present disclosure can also provide to all systems engineering groups, one comprehensive authoritative state of the platform at any point in product development cycle that they can run powerful queries on. For instance, when different teams working in different silos during product development make changes that impact other systems of silos, the information may not be readily understood and available to all silos. A graph model that is being worked on collaboratively with data sources from different silos can inform anyone interested where the development and changes stand today, thus, keeping everyone on the same page. For example, as the system is being built, several design changes happen and maintenance manual authoring team may be trying to author the manual for this changing system based on the last input source they received from systems engineering which is obsolete after several changes. If they have access to this graph model, they will know the latest state to author the manual correctly, avoid rework, and complete the manual authoring work in time before sales release.

Aspects of the present disclosure further help increase collaboration between systems engineering groups, wherein using the proposed connected model, impact and ramifications of changes in one silo on another silo are easily understood and before committing such changes, different silos can come together and manage the impacts effectively to avoid problems later on in the development cycle when timelines usually get very tight.

Aspects of the present disclosure can further enable spotting and fixing of problems before they propagate to other engineering silos. The proposed comprehensive graph model allows for powerful queries to assess impact of changes being made on the entire system and spot problems early and make it easy to notify all concerned. In an aspect, proposed architecture further enables ECU power consumption analysis with power drain modeled for all sensors and actuators connected to the ECU such that if data for power consumption ratings for the ECU and all the sensors and actuators connected to the ECU are available along with their duty cycles, it will be captured as properties of those sensors and actuators, which allows users of the proposed system to query the model for ECU power consumption, comparison of power drain between multiple ECUs and multiple design configurations. It could be used to identify duty cycle improvement opportunities so that more effective actuator driving algorithms could be explored.

Aspects of the present disclosure can further enable what-if-analysis pertaining to any modifications to the system, wherein if a design change is to be evaluated or multiple design options are to be assessed, they all could be added to the model, and the model can be queried to assess impact of each design on the overall system. What if analysis can also be performed for determining which parts of the system get affected by modifications such that the testing can be limited to those parts instead of the entire system. When vehicles in the field develop problems and a design/software change is developed to fix the problem, before the vehicles are recalled for the fix, the OEM needs to know if the fix doesn't cause any unintended consequences to the rest of the system, which can be done by extensive field testing which is expensive and time consuming. A query into the graph model of the present invention can, on the other hand, readily identify subsystems and individual parts these changes can affect and the testing can be limited only to those parts and subsystems. Aspects of the present disclosure can also enable DTC-point of failure latency analysis if the latency is captured in the model such that if the latency in computing software variables upon providing the inputs is available, it can be modeled as edge properties. When certain points of failure for the vehicle hardware become active, the graph model can tell software variables it will activate. Thereon, the latency for tripping the DTC could be estimated with shortest and longest path between the triggered software variable and the DTC.

Aspects of the present disclosure also help determine diagnostics detectability (reach), wherein a matrix of points of failure and all possible evidences (Entities that provide information about which points of failure may be active such as repairs, tests, DTCs, observations) can be obtained by querying the graph model. Such a matrix can show how and if each of the points of failure could be detected. For improving detectability of a point of failure, one could decide to add another test or DTC based on this matrix. Detectability can also be used for cost justification for adding or removing sensors from design, wherein if certain points of failure could be detected in multiple ways based on the detectability matrix, it could be possible to lose one of the ways of detecting it without much consequence. For example, if multiple DTCs related to different sensors detect a point of failure then perhaps removing one of those sensors and the related DTC from the system design could be considered if the sensor has no other critical uses. Similarly, if there is a point of failure that is difficult to detect based on the detectability matrix and the activation of this point of failure may result in rapidly accumulating damage in other parts and expensive repairs then addition of a sensor that may be linked to a new DTC that provides information about this point of failure could be considered by weighting the average cost of such repairs and the cost of adding a sensor.

Aspects of the present disclosure can also be used to develop an initial maintenance manual, wherein the graph model has all connectivity information about parts, their points of failure, DTCs that detect them, tests that identify them and repairs that fix them. A model query can produce the possibly affected parts, tests and repairs for each DTC. This would be the initial maintenance manual for each DTC. The model can also provide maintenance actions for a group of DTCs.

The present disclosure helps create a comprehensive connected model for efficiently performing diagnostics and prognostics of a system.

The present disclosure helps create a comprehensive connected model from various sources of inputs, for example different engineering documents, source code, etc.

The present disclosure helps create a model for diagnostics and prognostics of hardware system (for example machinery platform) as well as for software systems.

The present disclosure helps create an efficient model that can uncover data gaps between various engineering documents and uncover data mismatch between engineering artifacts.

The present disclosure provides a comprehensive model that can be used to determine parts or software variables that can possibly affect/cause failure/error.

The present disclosure enables creation of an efficient connected model that can be used for diagnostic reasoning.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present invention provides a scalable and flexible model compared to existing models.

The present invention enables handling of larger amount of data and querying of such data.

The present invention enables a connected graph architecture that does not slow down computation or cause system crashes.

The present invention has an ability to handle data in a distributed environment.

The present invention enables a connected graph model that does not require the use of predefined input schemas and structured databases.

The present invention provides a more comprehensive connected model from different input documents.

The present invention provides a model that connects entire system for analytics, diagnostics, system engineering, support, prognostics, among other like functions.

The present invention provides robust system for generating call graphs from system model.

The present disclosure enables the model building effort to be reduced by an order of magnitude due to simplicity of parsing a graph compared to querying a structured DB.

The present disclosure enables the model building effort to be reduced, which allows incorporation of all available model details without additional cost.

The present disclosure provides a connected model/graph that produces more accurate diagnostics.

The present disclosure enables query speed and query depth to be significantly increased through use of the proposed graph DB/database, which allows for complex queries that are impossible to execute with relational databases. Moreover, the queries needed for diagnostics can be executed almost instantaneously.

We claim:

1. A method to enable diagnostics and/or prognostics of health of an equipment platform, said method comprising the steps of:

extracting a plurality of entities of the equipment platform from two or more different input sources;

analyzing the plurality of entities extracted from the two or more different input sources to generate a graph database having one or more nodes representing the plurality of entities of the equipment platform, and having one or more edges connecting a parent node with a plurality of child nodes and defining a parent-child relationship there between, and wherein the generated graph database is used to construct a connected graph that is representative of the graph database and the connected graph dynamically changes based on changes in the graph database, wherein the connected graph comprises a plurality of connected sub-graphs, the connected sub-graphs pertaining to different types of input sources of the two or more different input sources; and performing the diagnostics and/or prognostics of the equipment platform based on the connected graph, wherein performing the diagnostics and/or prognostics of the equipment platform comprises:

receiving a query which identifies at least one entity of the plurality of entities of the equipment platform, wherein the at least one entity is represented as a first node in the connected graph and the first node is connected via edges to a plurality of second nodes representing a plurality of children entities related to the at least one entity; and recursively executing the received query on the connected graph starting from the first node representing the at least one entity identified from the received query, and on each of the plurality of second nodes until all children of the at least one entity are traversed so as to output data corresponding to the plurality of children related to the at least one entity.

2. The method of claim 1, wherein the two or more different input sources are selected from any or a combination of system engineering documentation, software/source code, fault tree(s), DTC and PID list(s), service manuals, system fault models, embedded code, DFMEA, specification document(s), and maintenance manual, and wherein the one or more entities comprise any or a combination of software entities, hardware entities, variables, and parts that relate to the equipment platform.

3. A system configured to enable health monitoring of an equipment platform, said system comprising:

a non-transitory storage device having embodied therein one or more routines operable to facilitate generation and traversal of a connected graph;

one or more processors coupled to the non-transitory storage device and operable to execute the one or more routines to:

extract data pertaining to the equipment platform from a plurality of different input sources, wherein the extracted data comprises a plurality of entities of the equipment platform;

analyze the extracted data and determine dependency relationships between the plurality of entities extracted from the plurality of different input sources by creating at least one edge list;

construct a graph database based on the at least one edge list and comprising a plurality of nodes representing the plurality of entities and a plurality of edges connecting the plurality nodes, each edge of the plurality of edges joining a start node with an end node and defining relationship there between, wherein the graph database comprises a first node of the plurality of nodes connected by one or more edges with a plurality of second nodes and defining a parent-child relationship there between; and create the connected graph from the at least one edge list and store said connected graph in the graph database or in a graph library, wherein the connected graph is queriable for any or a combination of a network sub-graph identification, network paths shortest/longest paths, nodes, edges, node properties, and edge properties, wherein the connected graph dynamically changes based on changes in the graph database, and wherein the connected graph comprises a plurality of connected sub-graphs, the connected sub-graphs pertaining to different types of input sources of the two or more different input sources.

4. The system of claim 3, wherein the plurality of different input sources are selected from any or a combination of system engineering documentation, software/source code, fault tree(s), simulation models, DTC and PID list(s), service manuals, system fault models, embedded code, DFMEA, specification document(s), wiring diagrams, hydraulic diagrams, Simulink models, Mechanical system models, Mechanical drawings, and maintenance manual.

5. The system of claim 3, wherein the data is received from one or more distributed or centralized input sources.

6. The system of claim 3, wherein the one or more processors are further configured to identify one or more updates to the graph database based on incoming data, and dynamically update the connected graph based on the incoming data.

7. The system of claim 3, wherein the received data is structured in big data format for efficiently processing the data while generating the connected graph.

8. The system of claim 3, wherein the one or more entities comprise any or a combination of software entities, hardware entities, variables, and parts that relate to the equipment platform.

9. The system of claim 3, wherein analysis of the extracted data comprises parsing the data from the plurality of different input sources in order to extract the plurality of entities of the equipment platform in the form of nodes having respective node properties, and determining edges between the obtained one or more node entities of the equipment platform, each edge of the determined edges having an edge property to generate the at least one edge list.

10. The method of claim 1, wherein the at least one of the two or more different input sources comprises at least one of a centralized input source or a distributed input source.

11. The method of claim 1, further comprising identifying one or more updates to the graph database based on incoming data from an input source of the two or more different input sources, and dynamically update the connected graph based on the incoming data.

12. The method of claim 1, wherein data extracted from the two or more different input sources is structured in big data format for efficiently processing the data while generating the connected graph.

13. The method of claim 1, wherein the plurality of entities comprise any or a combination of software entities, hardware entities, variables, and parts that relate to the equipment platform.

14. The system of claim 3, wherein the plurality of different input sources are selected from any or a combination of system engineering documentation, software/source code, fault tree(s), DTC and PID list(s), service manuals, system fault models, embedded code, DFMEA, specification document(s), and maintenance manual, and wherein the one or more entities comprise any or a combination of software entities, hardware entities, variables, and parts that relate to the equipment platform.

* * * * *